US007480638B1

(12) United States Patent
Sze

(10) Patent No.: US 7,480,638 B1
(45) Date of Patent: Jan. 20, 2009

(54) METHOD AND SYSTEM AUTOMATICALLY TO REMIND PARTIES TO A NETWORK-BASED TRANSACTION TO COMPLY WITH OBLIGATIONS ESTABLISHED UNDER A TRANSACTION AGREEMENT

(75) Inventor: Vicky Sze, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 1863 days.

(21) Appl. No.: 09/827,132

(22) Filed: Apr. 3, 2001

(51) Int. Cl.
*G06F 17/60* (2006.01)
(52) U.S. Cl. .............................. 705/80; 705/1; 705/26
(58) Field of Classification Search ................. 705/37, 705/1, 26, 80; 235/379, 808
See application file for complete search history.

(56) References Cited

U.S. PATENT DOCUMENTS

| | | | | |
|---|---|---|---|---|
| 4,799,156 A * | 1/1989 | Shavit et al. ................... 705/26 |
| 5,253,165 A * | 10/1993 | Leiseca et al. ................. 705/5 |
| 5,305,200 A * | 4/1994 | Hartheimer et al. ........... 705/37 |
| 5,495,412 A * | 2/1996 | Thiessen ........................ 705/1 |
| 5,557,518 A * | 9/1996 | Rosen .......................... 705/69 |
| 5,629,982 A * | 5/1997 | Micali .......................... 380/30 |
| 5,666,420 A * | 9/1997 | Micali .......................... 380/30 |
| 5,671,279 A * | 9/1997 | Elgamal ....................... 705/79 |
| 5,677,955 A * | 10/1997 | Doggett et al. ................ 705/76 |
| 5,715,314 A * | 2/1998 | Payne et al. ................... 705/78 |
| 5,732,400 A * | 3/1998 | Mandler et al. ............... 705/26 |
| 5,757,917 A * | 5/1998 | Rose et al. .................... 705/79 |
| 5,787,402 A * | 7/1998 | Potter et al. ................... 705/37 |
| 5,790,677 A * | 8/1998 | Fox et al. ...................... 705/78 |
| 5,790,790 A | 8/1998 | Smith et al. |
| 5,794,207 A * | 8/1998 | Walker et al. .................. 705/1 |
| 5,802,497 A * | 9/1998 | Manasse ...................... 705/27 |
| 5,809,144 A * | 9/1998 | Sirbu et al. .................... 705/53 |
| 5,826,244 A * | 10/1998 | Huberman .................... 705/37 |
| 5,845,265 A | 12/1998 | Woolston |
| 5,873,071 A * | 2/1999 | Ferstenberg et al. ....... 705/36 R |
| 5,897,621 A * | 4/1999 | Boesch et al. ................. 705/26 |
| 5,905,975 A * | 5/1999 | Ausubel ....................... 705/37 |
| 5,918,218 A * | 6/1999 | Harris et al. .................. 705/37 |
| 5,924,082 A * | 7/1999 | Silverman et al. ............ 705/37 |
| 5,963,923 A * | 10/1999 | Garber ......................... 705/37 |
| 6,014,643 A * | 1/2000 | Minton ..................... 705/36 R |
| 6,047,264 A | 4/2000 | Fisher et al. |
| 6,061,448 A | 5/2000 | Smith et al. |
| 6,085,176 A | 7/2000 | Woolston |

(Continued)

*Primary Examiner*—Evens J Augustin
(74) *Attorney, Agent, or Firm*—Schwegman, Lundberg & Woessner, P.A.

(57) ABSTRACT

A method to facilitate a network-based commerce transaction commences with the recording of a transaction agreement (e.g., a item purchase transaction) between a buyer and a seller. The transaction agreement is established utilizing a network-based transaction system (e.g., an online auction facility). A reminder option is automatically presented to the seller a predetermined time period after the establishment of the transaction agreement. The seller may exercise the reminder option to cause an electronic reminder (e.g., an e-mail message), to be communicated to one or more buyers. The communication encourages the buyer to comply with obligations established by the commerce transaction agreement by making payment to the seller. By automatically prompting sellers to issue reminders to buyers a predetermined time period after the establishment of a commerce transaction, for example, the number of occurrences of non-paying buyers may be reduced.

35 Claims, 10 Drawing Sheets

U.S. PATENT DOCUMENTS

| | | |
|---|---|---|
| 6,119,137 A | 9/2000 | Smith et al. |
| 6,141,653 A * | 10/2000 | Conklin et al. ............... 705/80 |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 2001/0037204 A1 * | 11/2001 | Horn et al. ................... 705/1 |

* cited by examiner

My Item - USER NAME

| Items I'm Selling | | | | | | | | | See all item details | |
|---|---|---|---|---|---|---|---|---|---|---|
| Check to delete | Item # | Item Title | Start Price | Current Price | Reserve Price | Qty | # of Bids | Start Date | (PST) End Date | Time Left |
| ☐ | 563284237 | Kosta Boda Paper Weights Artist Collection | $2.00 | $3.00 | n/a | 10 | 13 | Jul-27 | Aug-04 | Ended |
| ☐ | 158381656 | Size 7 shoes Mens Timberland dark brown | $10.00 | $11.00 | n/a | 1 | 1 | Jul-27 | Aug-04 | Ended |
| [Delete] checked items (ended items only) | | | Start Price | Current Price | Reserve Price | Qty | # of Bids | Start Date | End Date | Time Left |
| | | Current totals - all items: | $12.00 | $14.00 | -- | 13 | 14 | -- | -- | -- |

| Items I've Sold | | | | | | | | | |
|---|---|---|---|---|---|---|---|---|---|
| Check to delete | Item # | Item Title | (PST) End Date | End Price | Qty | High Bidder(s) | Paid via Payment Service | Payment Reminder | Leave Feedback |
| ☐ | 247283892 | Antique camera with special lens and more | Jul-23 | 35.00 | 1 | jjacobs@aol.com (1) | Invoice Sent | Available in 3 days | Leave Feedback |
| ☐ | 759734824 | Princess beanie baby, rare version *in blue* | Jul-22 | $178.50 | 1 | beaniemeanie (167 | Paid | ☒ Paid | Feedback left |
| ☐ | 457543290 | Ruby ring, Marquis cut on white gold band | Jul-19 | $113.50 | 1 | DiamondDave (396) | -- | ☐ Send Reminder | Leave Feedback |
| ☐ | 705237532 | Vintage Wooden Camera w/Shroud & Tripod | Jul-18 | $252.00 | 1 | kgordon@aol.com (244) | Instant Purchase | ☒ Instant Purchase | Feedback left |
| ☐ | 759564824 | Princess beanie baby Mint with tags, ns home | Jul-18 | $78.50 | 5 | See Dutch high bidders | Send Invoice | ☒ Reminder Sent | Feedback left |
| [Delete] checked items | | | End Date | End Price | Qty | High Bidder(s) | Paid via Payment Service | Payment Reminder | Leave Feedback |

FIG. 6

Payment Reminder - DUTCH AUCTION

Please check the information in the highlighted sections below:

- Check the buyers who need to receive this reminder email.
- Specify your payment address at the bottom of this page. Otherwise, check the option: "Don't send any payment address".

| Send this message to | | | |
|---|---|---|---|
| Check | User ID | Bid amount | Quantity |
| ☐ | lfelipe23 (485) ☐ | $13.75 | 12 |
| ☐ | limeer33 (5) ☐ | $11.26 | 3 |
| ☐ | jognsm2 (4) ☐ | $9.30 | 4 |
| Buyers who already received this email reminder for this listing | | | |
| mickel2 (4), jimw (122) ☐ , jeffery32 (13), mickel2 (6) , jimw (122) ☐ , jeffery32 (13) | | | |
| Buyers who already received a Non-Paying Bidder Alert for this listing | | | |
| george32(6) ☐ , hehfs (12) ☐ , kimbader (13) ☐ | | | |
| Email message | | | |
| Congratulations, you are the winning bidder of this listing:<br>Title: Java Made Simple, New Book (Item# 480637058)<br><br>Auction Ended At: Nov-05-00 14:02:43 PST<br>Seller User ID: seller<br>Seller E-mail: seller@hotmail.com<br><br>Thank you for your winning bid. Please contact the seller for payment information as soon as possible. Reminder: your winning bid is a binding contract to purchase the item. | | | |
| Email message - Optional sections<br>Check the sections you'd like to add to this email: | | | |
| Seller's contact information | | | |
| ☐ Name: Seller Smith | | | |
| ☐ Address: 5 crestview mountain view, CA, USA | | | |
| ☐ Phone: 650-555-0000 | | | |
| ☐ Payment for each item | | | |
| Final listing price for each item:<br>Shipping, handling, tax $ [    ]  For more details about your total payment, contact etc.: the seller at: seller@hotmail.com or see item description | | | |
| ☐ Payment for each item | | | |
| Seller accepts the following payment methods:<br>Visa/MasterCard, Money Order/Cashiers Checks, Personal Checks, Other. See item description for payment methods accepted. | | | |

FIG. 7A

Send Payment to
- ◉ Don't send any payment address
- ○ Use my contact information stored at auction facility (use address filled above).
- ○ Different address (fill out below)

☐ Copy this email to me at: john@hotmail.com   Change my email address

Send reminder

- ◉ Preview
- ○ Send email now and preview the next email
- ○ Send ALL emails now

Payment Reminder - CHINESE AUCTION

From: aw-confirm@ebay.com
To: buyer@net1.com
CC: seller@hotmail.com
Subject: eBay payment reminder for item Java Made Simple, New Book (Item# 480637058)
Date: Mon, 06 Nov 2000 08:59:27 PST Dear Buyer Congratulations, you are the winning bidder of this listing:

Title: Java Made Simple, New Book (Item# 480637058)
Final Price: $5.00
Auction Ended At: Nov-05-00 14:02:43 PST Thank you for your winning bid. Please contact the seller for payment information as soon as possible. Remember: your winning bid is a binding contract to purchase this item.

*Seller's contact information:
User ID: vereds
Name: Seller Smith
E-mail: seller@hotmail.com
Address: 5 crestview mountain view, CA, USA
Phone number:: 650-555-0000

*Payment:
Final Price: $5.00
Shipping: $1.00
For more details about your total payment, contact the seller at seller@hotmail.com or see item description at:
http://<URL>

*Seller accepts the following payment methods:
Visa/MasterCard, Money Order/Cashiers Checks, Personal Checks, Other. See item decription for payment methods accepted.

* Send payment to:
Seller Smith
12 crestview san jose
CA, 94142

This auction's results, including email addresses of the seller, are available for 30 days in My eBay and at http://<URL>

FIG. 8

METHOD AND SYSTEM AUTOMATICALLY TO REMIND PARTIES TO A NETWORK-BASED TRANSACTION TO COMPLY WITH OBLIGATIONS ESTABLISHED UNDER A TRANSACTION AGREEMENT

FIELD OF THE INVENTION

The present invention relates generally to the field of electronic commerce and, more specifically, to reminding a party to a network-based commerce transaction to comply with obligations established in terms of a transaction agreement.

BACKGROUND OF THE INVENTION

Commerce interactions conducted over an electronic communication network (e.g., the Internet), which is often referred to as electronic commerce (e-commerce), typically concludes with the establishment of a commercial transaction between a buyer and a seller for the purchase and exchange of goods and/or services in return for value. Electronic commerce is becoming increasingly popular in a number of markets, including the so-called consumer-to-consumer (C2C), business-to-consumer (B2C) and business-to-business (B2B) markets.

Within the consumer-to-consumer and business-to-business markets, network-based commerce marketplaces that operate auctions are popular. Such on-line auction marketplaces are run by companies such as eBay, Inc., Yahoo!, Inc. and Amazon, Inc. These market operators may further facilitate fixed-price transaction mechanisms for the establishment of commerce transactions between buyers and sellers (e.g., the Buy-It-Now feature offered by eBay, Inc.).

Whatever the mechanism for the establishment of a commerce transaction via a network-based marketplace, interactions between the buyer and seller are typically limited to interactions within the constraints of a transaction mechanism (e.g., an auction process or fixed price purchase process) provided by the electronic marketplace. Certain marketplaces may provide parties to a transaction with the option of maintaining a degree of anonymity with respect to another party. For example, e-mail and address information concerning a potential party to a transaction may not be revealed to other parties.

An active participant within an electronic marketplace may participate in a large number of transactions within a given time interval. It will be appreciated that the management and follow-up with respect to a large number of transactions becomes burdensome for an active marketplace participant.

From the perspective of on-line marketplaces, an administrative burden may be placed on such marketplaces by parties to a transaction who do not fulfill their obligations in terms of a transaction. For example, a network-based auction facility, such as that operated by eBay, Inc., has a large number of so-called "non-paying bidders". These are bidders who have failed to make a payment to a seller after successfully winning an auction. Complaints regarding such non-paying bidders are typically communicated to the network-based marketplace by a seller. In order to address such complaints, a network-based marketplace may implement a number of mechanisms to address the concerns of aggrieved sellers. For example, an arbitration mechanism may seek to settle differences between parties. Further, where a defaulting party is unable to provide a satisfactory explanation for defaulting with respect to obligations, the marketplace may take certain steps against the defaulting party. For example, the defaulting party may be barred from participating in the marketplace until the party complies with outstanding obligations, or a negative rating may be applied to the defaulting party to discourage other parties from transacting with the defaulting party in the future.

SUMMARY OF THE INVENTION

According to the present invention, there is provided a method to facilitate a network-based commerce transaction. The establishment of a commerce transaction agreement between first and second parties for the purchase of an offering is recorded. The commerce transaction agreement is concluded utilizing a network-based transaction system, and the commerce transaction agreement imposes first and second obligations on the first and second parties respectively.

A remind option is automatically presented to the first party, the remind option being exercisable by the first party to remind the second party to comply with the obligation imposes on the second party in terms of the commerce transaction agreement.

Other features of the present invention will be apparent from the accompanying drawing and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 6 illustrates an exemplary user interface that contains a listing of offerings that are the subjects of commerce transactions, and illustrates the display of reminder icons, in various states and associated with each of the entries of the listing.

FIG. 7 illustrating an exemplary confirmation page that is presented to a seller to confirm the content of a payment reminder communication to be sent to a buyer.

FIG. 8 illustrates an exemplary reminder e-mail that may be communicated to a buyer that has participated in a successful Chinese auction facilitated by an auction facility.

DETAILED DESCRIPTION

A method and system automatically to remind parties to a network-based transaction to comply with obligations imposed by a transaction agreement are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include commercial transactions including sale and purchase transactions, auctions and the like.

Transaction Facility

Figure 1:
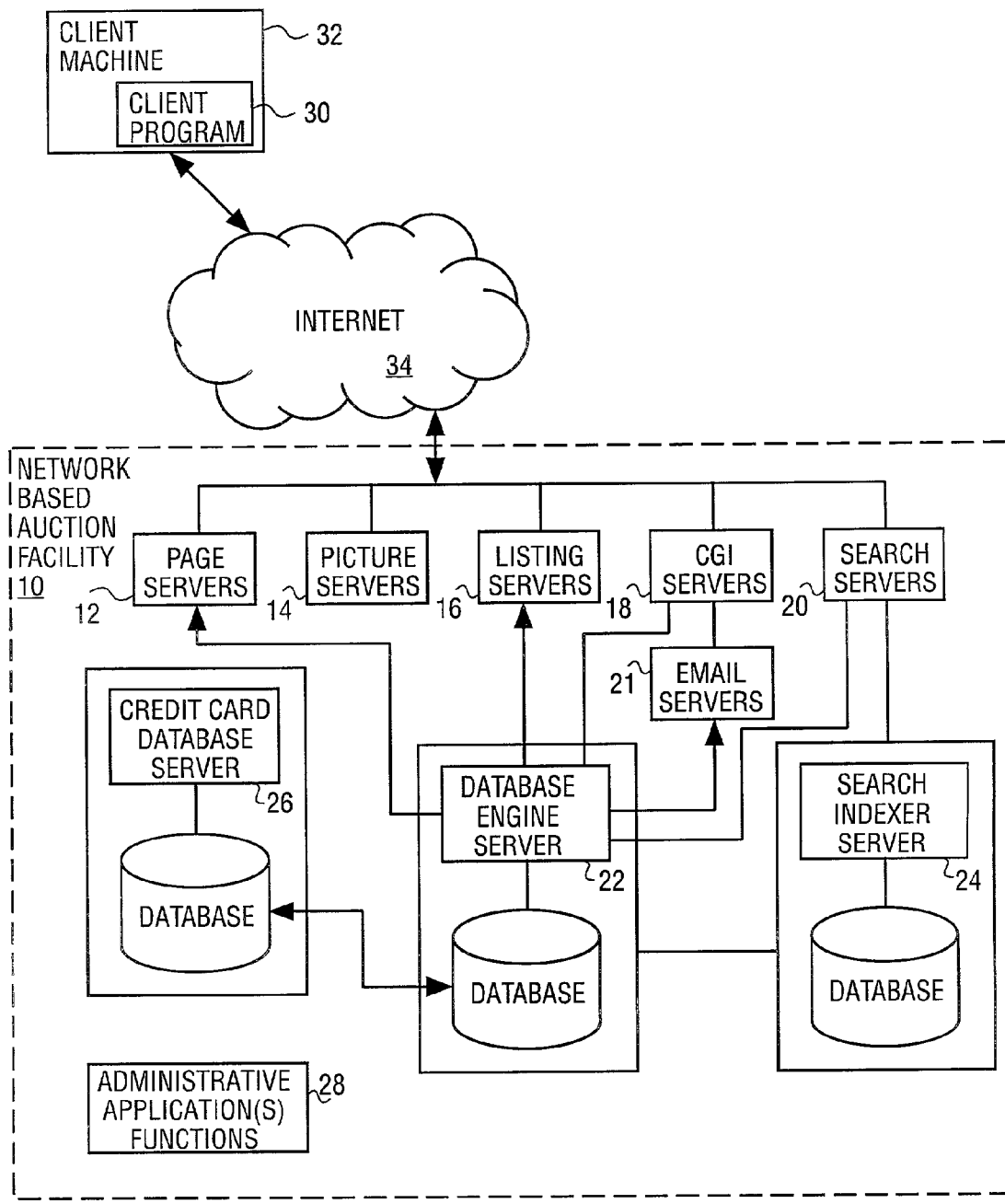
FIG. 1 is a block diagram illustrating an exemplary network-based transaction facility in the form of an internet-based auction facility 10.

FIG. 1 is block diagram illustrating an exemplary network-based commerce facility in the form of an Internet-based auction facility 10. While an exemplary embodiment of the present invention is described within the context of an auction facility, the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10. The page servers 12, picture servers 14, CGI servers 18, search service 20, e-mail servers 21 and database engine server 22 may individually, or in combination, act as a communication engine to facilitate communications between, for example, the client machine 32 and the network-based auction facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Public Switched Telephone Network (PSTN) network.

Database Structure

Figure 2:
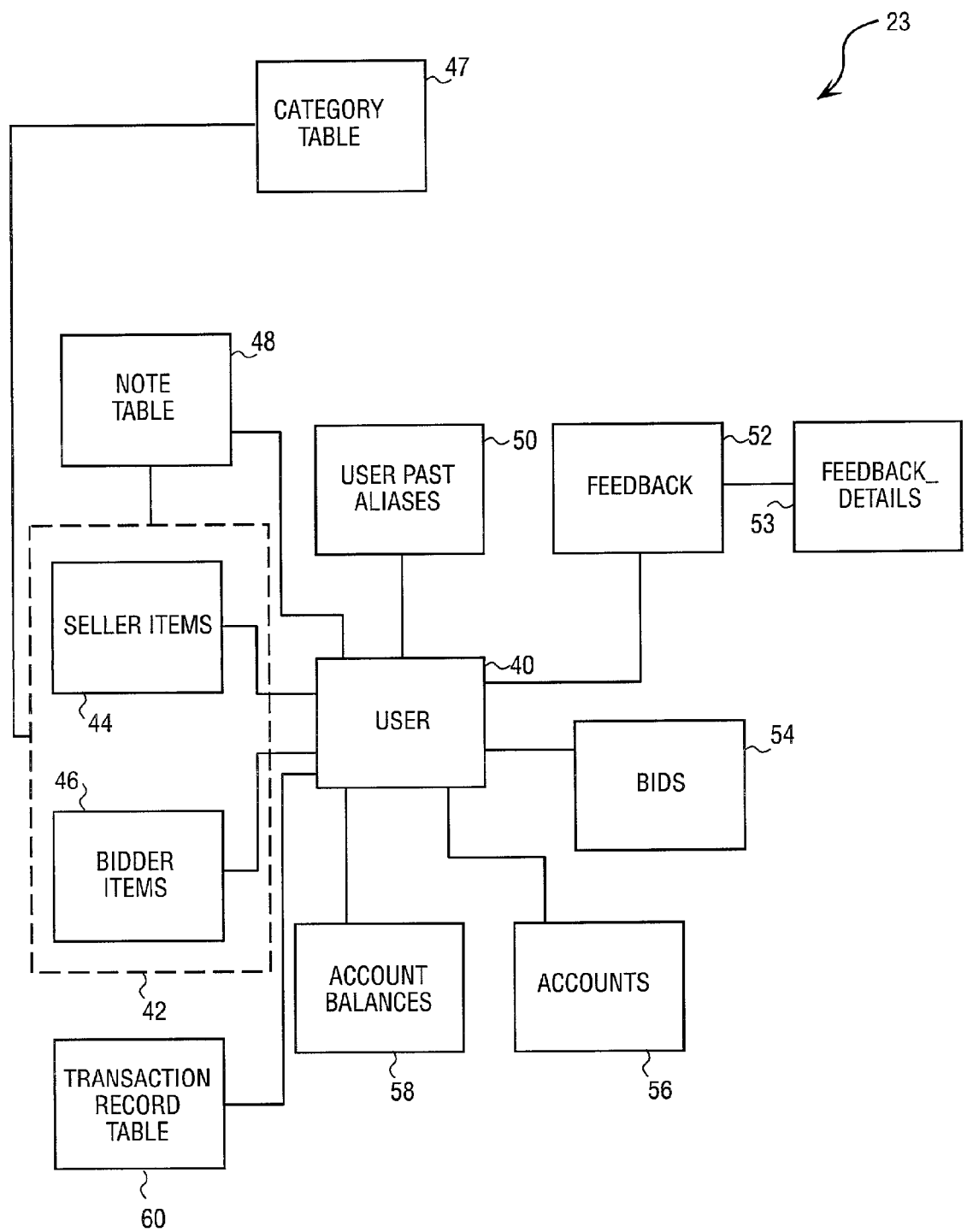
FIG. 2 is a database diagram illustrating an exemplary database, maintained and accessed via a database engine server, which at least partially implements and supports the auction facility.

FIG. 2 is a database diagram illustrating an exemplary database 23, maintain by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the auction facility 10. A user may operate as a seller, buyer, or both, within the auction facility 10. The database 23 also includes items tables 42 that may be linked to the user table 40. The items tables 42 may include a seller items table 44 and a bidder items table 46. A user record in the user table 40 may be linked to multiple items that are being, or have been, auctioned or otherwise offered for sale via the facility 10. A link indicates whether the user is a seller or a bidder (or buyer) with respect to items for which records exist within the items tables 42.

The database 23 also includes one or more category tables 47. Each record within the category table 47 describes a respective category. In one embodiment, a specific category table 47 describes multiple, hierarchical category structures, and includes multiple category records, each of which describes the context of a particular category within the one of the multiple hierarchical category structures. For example, the category table 47 may describe a number of real, or actual, categories to which item records, within the items tables 42, may be linked.

The database 23 also includes a note table 48 populated with note records that may be linked to one or more item records within the items tables 42 and/or to one or more user records within the user table 40. Each note record within the table 48 may include, inter alia, a comment, description, history or other information pertaining to an item being auctioned via the auction facility 10, or to a user of the auction facility 10.

A number of other tables are also shown to be linked to the user table 40, namely a user past aliases table 50, a feedback table 52, a feedback details table 53, a bids table 54, an accounts table 56, an account balances table 58 and a transaction record table 60.

Figure 3:
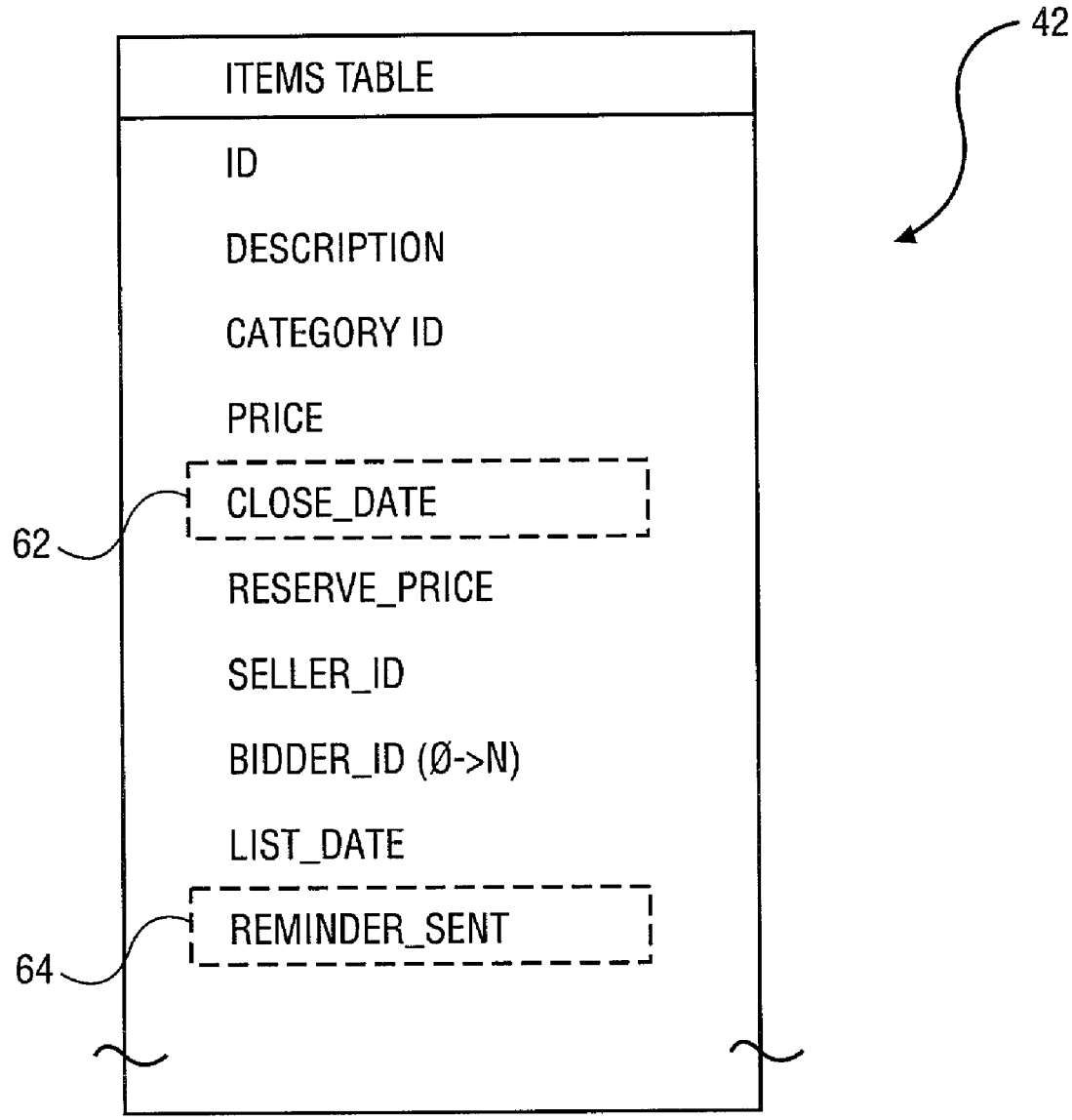
FIG. 3 is a representation of an item table, according to an exemplary embodiment of the present invention.

FIG. 3 is a diagrammatic representation of an items table 42, according to an exemplary embodiment of the present invention. The items table 42 is shown to define a number of fields for each record that describes an item being offered for sale via the auction facility 10. A close date field 62 records the date and time for which an auction for the relevant item will end and at which a successful bidder may be identified. A reminder sent field 64 within each record, in one embodiment, stores a flag indicating whether a payment reminder has automatically been sent by the auction facility 10 to a successful bidder (or buyer). The mechanism for the communication of such a reminder is described in further detail below.

In addition to the close date and reminder sent fields 62 and 64, the items table 42 includes an item identifier, description, category identifier, price, reserve price, seller identifier, one or more bidder identifiers and list date information for a particular item.

Figure 4:
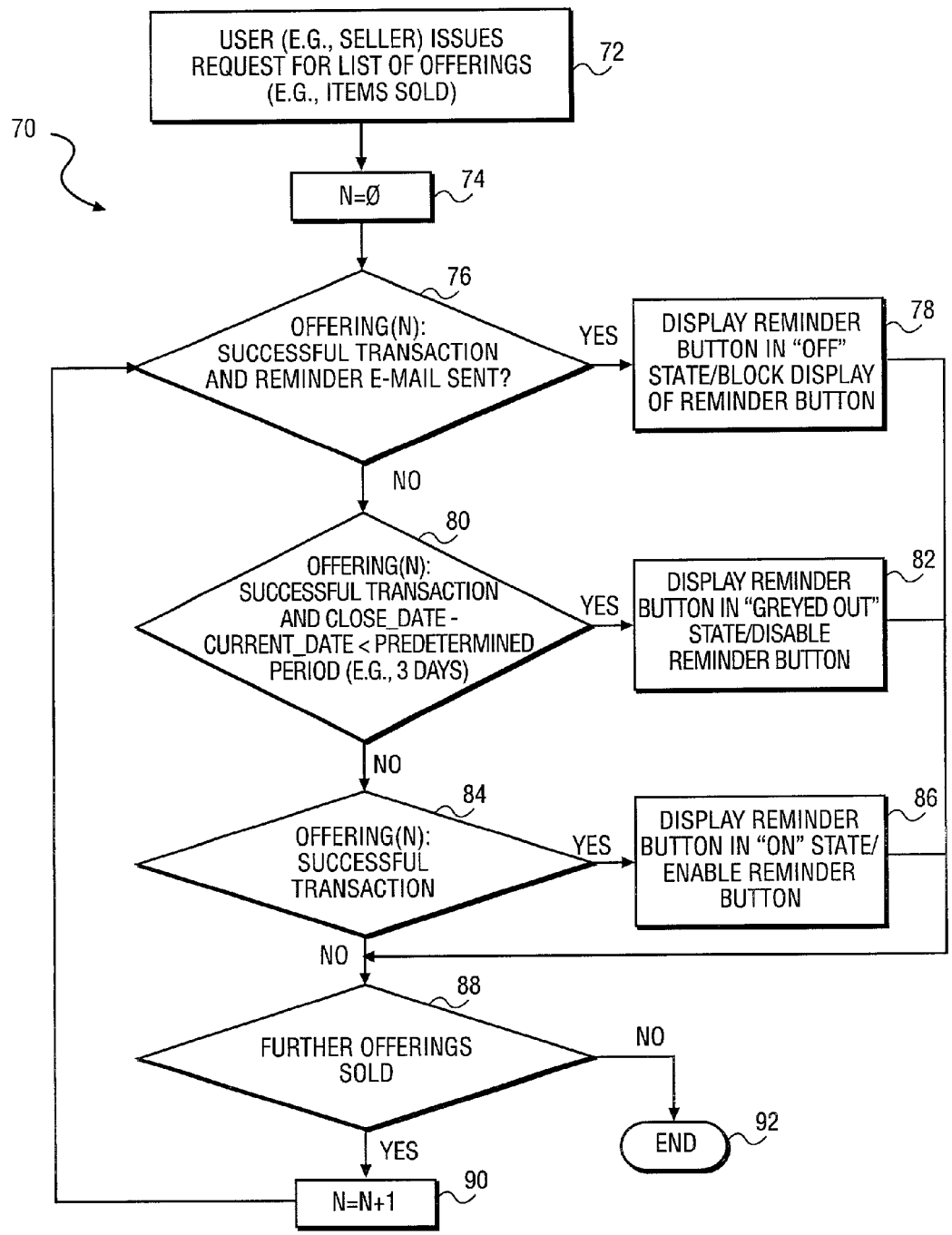
FIG. 4 is a flowchart illustrating a method, according to exemplary embodiment of the present invention, of automatically presented a remind option to party to commerce transaction, the party being able to exercise the remind option to remind a for the party to comply with obligations imposed in terms of the commerce transaction.

FIG. 4 is a flow chart illustrating a method 70, according to an exemplary embodiment of the present invention, of automatically presenting a reminder option to a party to a commerce transaction, the party being able to exercise the reminder option to remind a further party to comply with obligations establish in terms of a commerce transaction agreement. In the exemplary method 70, the presentation of the reminder option is the display of a reminder button on a user graphical interface. The reminder button is selectable by the party to invoke a process at the auction facility 10 whereby an e-mail is sent to a further party to the transaction (e.g., a buyer) to remind the buyer to provide a monetary payment to satisfy obligations imposed by an concluded purchase and sale transaction (or agreement).

Returning now specifically to the flow chart, at block 72 a user (e.g., a seller) may issue a request to the auction facility 10 for a list of offerings (e.g., items) that the user has made available for purchase via the auction facility 10. This list may specify items for which an auction process is ongoing (i.e., a close date not yet been reached), and items for which the auction process has completed.

FIG. 6 illustrates an exemplary user interface that includes an "items I am selling" portion 102 and "items I have sold" portion 104. The "items I am selling" portion 102 contains a listing of items for which the auction process is ongoing. The "items I have sold" portion 104 contains a listing of items for which the auction process is completed, and for which a successful bidder (or buyer) has been identified.

Returning to the method 70, upon receipt of the user request at the auction facility 10, a loop variable N is set to 0, the loop variable N indicating the first of N offerings (e.g., items) that the user may be selling or have sold.

At decision box 76, a determination is made as to whether a particular offering N is the subject of a successful and completed transaction and whether a reminder e-mail has been issued from the auction facility 10 to the buyer of the offering. A successfully completed transaction, within the context of the auction facility 10, may be an offering for which the auction process has completed and a particular bidder has been identified as a highest, and therefore successful, bidder. Alternatively, the auction facility 10 may offer a "fixed price" option whereby a transaction may be concluded when a buyer agrees to purchase the offering at a fixed, predetermined price. In one embodiment, the exercise of the "fixed price" option may automatically terminate any auction process to which the offering is subject, and successfully establish a transaction agreement. In either case, whether by an auction process or a fixed price purchase process, a transaction agreement may be concluded.

The determination of whether an e-mail reminder has been sent for a particular offering is determined by performing a look-up on the items table 42 to determine whether the reminder sent field 64 for the relevant record indicates that a reminder e-mail has been sent. This look-up on the items table 42 is performed by the database engine server 22 responsive to a query from the CGI servers 18.

Following a positive determination at decision box 76, the method 70 proceeds to block 78, where a reminder button 106, to be incorporated within a user interface generated by the auction facility 10 and displayed to the user, is generated in an "off" or disabled state. The "off" state from the reminder button 106 is included within the user interface to be displayed in association with descriptive information regarding the offering. FIG. 6 illustrates an exemplary reminder button 106 in the "off" state.

On the other hand, following a negative determination at decision box 76, at decision block 80 a further determination is made as to whether a transaction with respect to the offering N has been successfully concluded and whether a close date (i.e., a date and time at which a transaction process terminates) less the current date (e.g., a current date and time) is less than a predetermined period (e.g., three days). The close date for a transaction process may, in one exemplary embodiment, be determined by performing a look-up on the items table 42 to extract the pertinent information from the close date field 62.

If it is determined that less than the predetermined time period (or interval) has passed since the close date, at block 82 a reminder button 108 is generated and incorporated into the user interface in a "greyed out" state, which indicates that the reminder option has been temporarily disabled pending expiration of the predetermined time period. The temporary disablement of the reminder button pending expiration of the predetermined time period is advantageous in that it prevents a seller from issuing a reminder email to a buyer until after a reasonable time period has passed for the buyer to make payment to the seller.

FIG. 6 illustrates a "greyed out" reminder button 108 for an item that has recently been sold. It will be noted that an indication is provided below the "greyed out" reminder button 108 that indicates the reminder option will be available to the seller within three days after establishment of the transaction.

Following a negative determination at decision block 80, a determination is made at decision block 84 as to whether a successful transaction has been completed. Because of the conditions imposed at decision blocks 76 and 80, a positive determination at decision block 84 indicates that a transaction has been successfully concluded, a reminder e-mail has as not as yet been sent, and the predetermined period after establishment of the transaction has passed. Accordingly, following a positive determination at decision block 84, at block 86 an "on" or enabled reminder button 110 is identified for incorporation within the user interface. The "on" reminder button 110 is again located to be displayed in conjunction with descriptive information concerning the relevant offering N. FIG. 6 illustrates an exemplary "on" reminder button 110 which, in addition to being visually differentiated from the "off" reminder button 106 or the "greyed out" reminder button 108, has a Uniform Resource Locator (URL) associated therewith that is communicated back to the auction facility 10 upon user selection thereof. This URL, in one embodiment, invokes a process whereby the CGI server 18 and the e-mail server 21 of the auction facility 10 generate and transmit an e-mail message to a buyer concluded under a transaction pertaining to the offering.

Following a negative determination at decision block 84 (e.g., if the auction process for offering N has not yet completed or has been terminated for another reason), or upon completion of operations performed at any one of blocks 78, 82, 86, the method 70 proceeds to decision block 88 where a determination is made as to whether there are any further offerings, currently for sale, or for which transactions have been completed, for the relevant user (seller). If so, at block 90, the variable N is incremented, and the method 70 loops back to decision block 76 and the above described criteria are again applied to a next offering to determine the state of a reminder button to be displayed in association with descriptive information concerning the next offering. Alternatively, if there are no further offerings for the relevant user, the method 70 then ends at block 92 with the completion of the generation of the user interface to be presented to the user (e.g., the seller) listing offerings by that particular seller. In one embodiment, the generated user interface 100 constitutes a markup language document, which then may be communicated from the page servers 12 of the auction facility 10, via the Internet 34, for display by a client program 30 (e.g., a browser) executing on the client machine 32.

The determination at any of the decision blocks 76, 80 and 84 as to whether a transaction process has been successfully concluded depends on the relevant transaction process. For example, the transaction process may be a fixed price process whereby a buyer established a transaction by accepting the offer of the offering at a fixed price. Alternatively, the transaction process may be an auction process. Exemplary auction processes may be a conventional auction process, a Dutch auction process, a Chinese auction process or any other auction process whereby a transaction agreement is established between one or more buyers and one or more sellers for the sale and purchase of one or more offerings (e.g., items or services).

Figure 5:
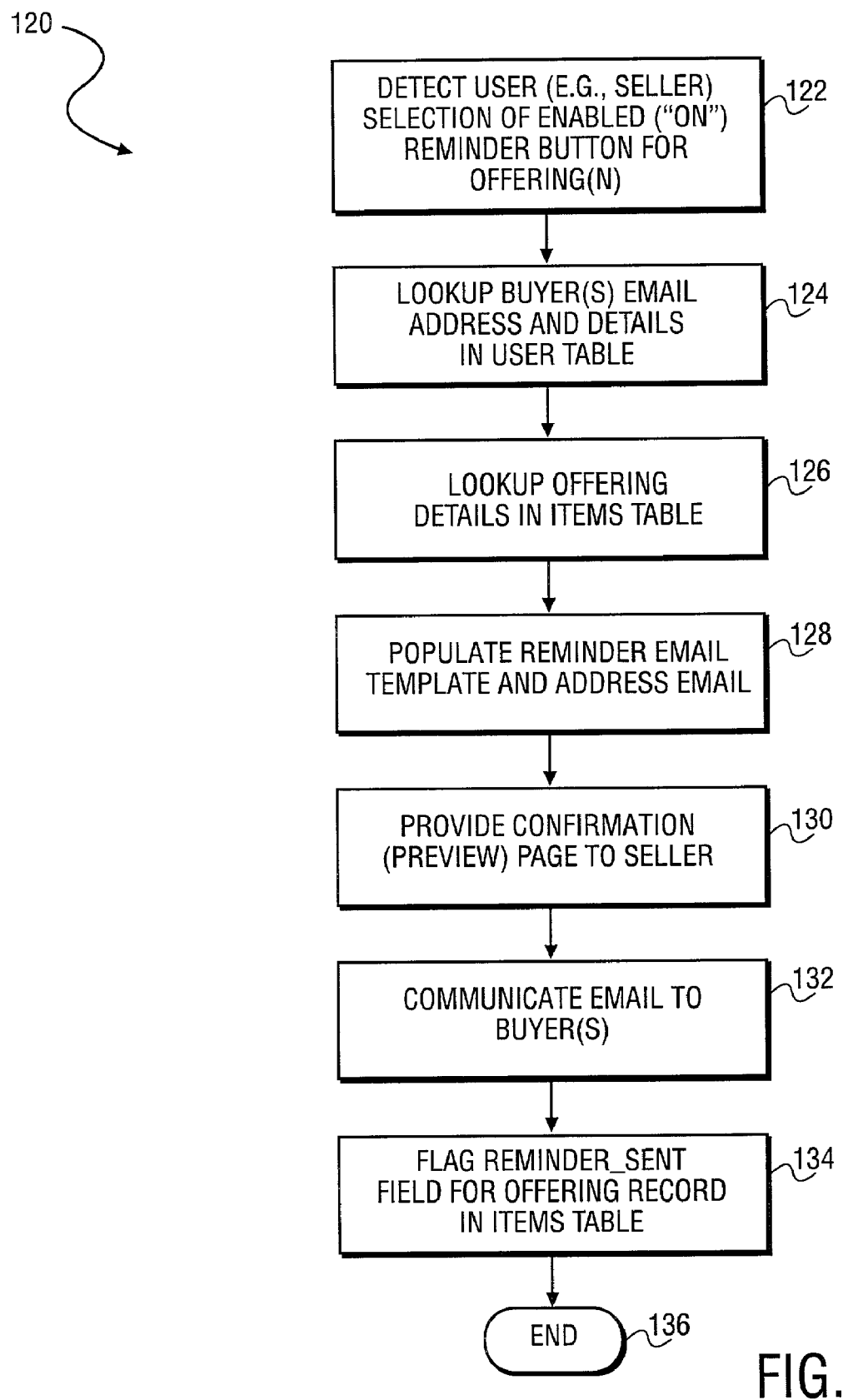
FIG. 5 is a flowchart illustrating a method, according to exemplary embodiment of the present invention, of issuing a reminder to a party to a commerce transaction to comply with obligations imposed in terms of the transaction agreement.

FIG. 5 is a flow chart illustrating a method 120, according to an exemplary embodiment of the present invention, of issuing a reminder to a party to a transaction agreement to comply with obligations imposed by the transaction agreement. The method 120 shall be described within the context of the exemplary user interface 100 shown in FIG. 6 as generated by the method 70 described above with reference to FIG. 4.

At block 122, the auction facility 10 detects user (e.g., seller) selection of an enabled or "on" reminder button 110 as presented to the user within the interface 100. As described above, the enabled reminder button 110 may have a URL associated therewith, this URL being communicated to the auction facility 10 responsive to user selection of the button 110. The URL identifies a process (e.g., a CGI process to be executed by the CGI server 18) that implements a number of the below described operations.

At block 124, responsive to the user selection of the enabled reminder button 110, a look-up is performed within the database 23, and specifically on the user table 40, to obtain an e-mail address and other details (e.g., name, physical address) regarding one or more buyers that are parties to a transaction agreement associated with the selected reminder button 110.

At block 126, a further look-up is similarly performed in the database 23, and specifically an items table 42, to retrieve details regarding the transaction agreement associated with the selected reminder button. The offering details may, for example, be derived from a record for the relevant transaction within the items table 42, as illustrated in FIG. 3.

At block 128, a page server 12 populates a reminder e-mail template with the offering details retrieved at block 126, and addresses the e-mail utilizing the buyer e-mail address retrieved at block 124.

At block 130, the auction facility 10, and specifically the page server 12, delivers a confirmation (or "preview") page (e.g., in the form of an HTML document). Following receipt of confirmation from the seller at block 132, the e-mail generated and addressed at block 128 is transmitted to the relevant buyer by an e-mail server 21.

At block 134, a flag is set within the reminder sent field 64 of the record for the relevant transaction as maintained in the items table 42. The method 120 then ends at block 136.

The content of the reminder e-mail template that is populated at block 128, and also the number of buyers to which the reminder e-mail is sent, are dependent upon the nature of the commerce transaction. For example, where the commerce transaction was concluded under a "Dutch auction" process, a single auction process may have imposed obligations on multiple buyers to each buy one or more offerings of a batch of offerings presented for sale. FIG. 7 illustrates an exemplary confirmation page 150, according to an exemplary embodiment of the present invention, that constitutes an HTML document that may be communicated to a seller at block 130 of the method 120 described above with reference to FIG. 5. The confirmation page 150 pertains to a Dutch auction, and accordingly provides a list of buyers, indicated at 152, to which the reminder e-mail may be communicated. The confirmation page 150 also provides a listing, at 154, of buyers who have already received an e-mail reminder pertaining to the relevant commerce transaction. The confirmation page also includes text 156 to be included within the e-mail reminder, seller contact information 158 that may optionally been included within the e-mail reminder, accepted payment methods 160, a payment address option 162, a "copy e-mail to seller" option 164 and a "send reminder" option 166.

With respect to the text 156, this is retrieved from a database table (not shown) that stores default reminder text for the relevant seller. In one embodiment, the seller is also able to edit the text 156 within the confirmation page 150.

With respect to the seller contact information 158, it will be noted that a checkbox is provided adjacent each of the seller contact information items. In this way, the seller can selectively identify personal information (e.g., contact information) to be included within an e-mail reminder to a buyer. The seller contact information 158 is retrieved from the user table 40 by a CGI server 18, responsive to a request to generate the confirmation page 150.

FIG. 8 shows an exemplary reminder e-mail that may be communicated to a buyer, at block 132 of FIG. 5, that participated in a successful Chinese auction facilitated by the auction facility 10.

The above-described embodiment of the present invention assumes a central network-based auction facility 10 that maintains a central database 23 of users and offerings. It will however be appreciated that the present invention may also be applied to a peer-to-peer trading system implemented as applications executing on distributed computer systems that communicate via a network. In this case, the methods 70 and 120 discussed above with reference to FIGS. 4 and 5 may be executed, for example, by an application program residing on a computer system of a seller.

The reminder that is communicated to one or more buyers at block 132 in FIG. 5 is also described, in the above exemplary embodiment, as being an e-mail message. However, in alternative embodiments, the reminder may be any electronic communication including a page message, a Wireless Access Protocol (WAP) message, a Short Message Service (SMS) message, or a display on a mark-up language document (e.g., a reminder on a web-based calendar or the like).

In the above described exemplary embodiment, the communication of a reminder to a buyer to comply with an obligation to make a payment to a seller has been described. In alternative exemplary embodiment, a reminder may be communicated to a seller to comply with an obligation to ship or supply an offering to a buyer.

Further, while the exemplary embodiment of the present invention has been discussed within the context of the network-based auction facility 10, the teachings of the present invention may be implemented within any network-based transaction system whereby transactions for the purchase and/or sale of an offering are concluded between two or more parties.

Software

Figure 9:
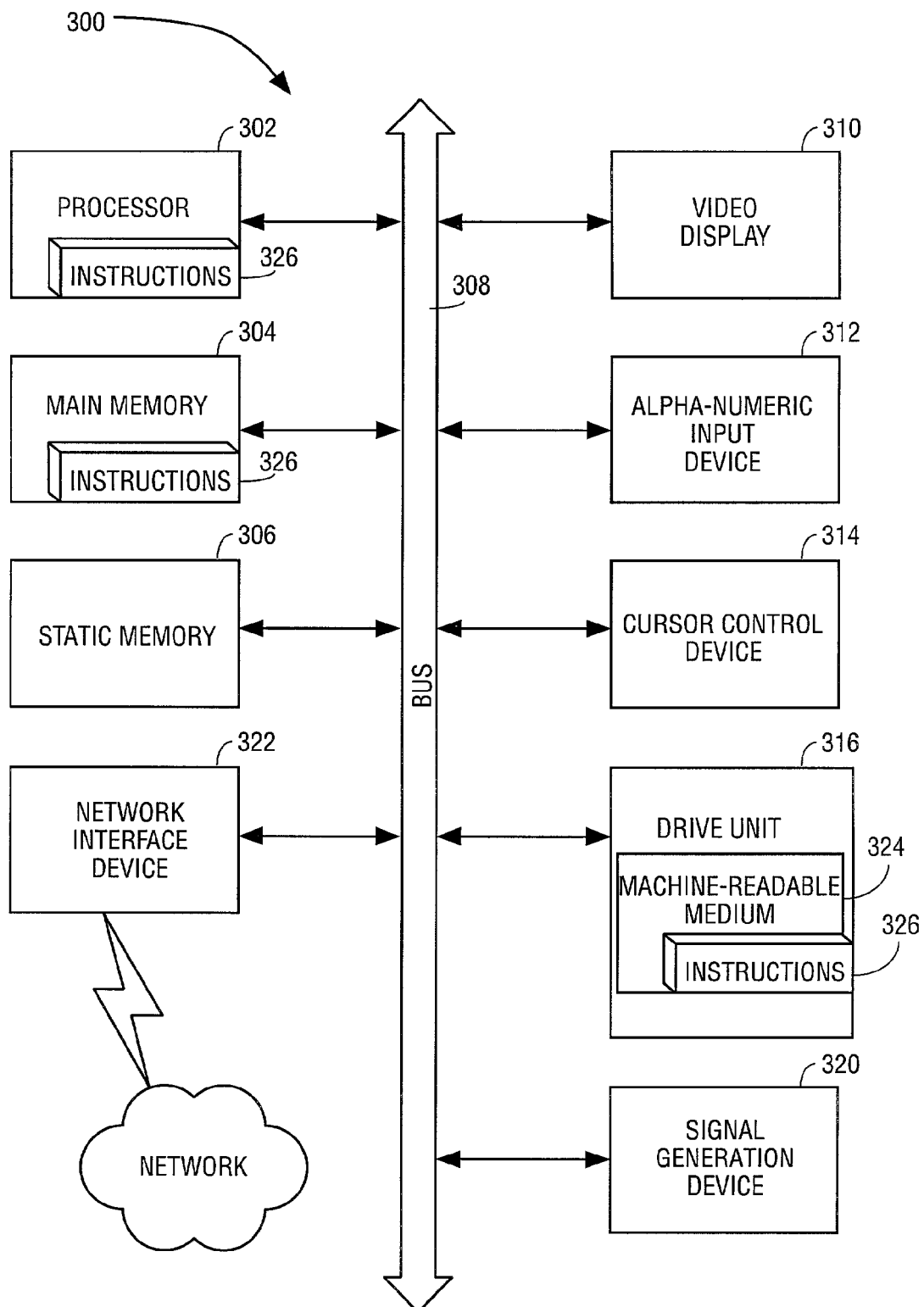
FIG. 9 is a diagrammatic representation of a machine in the exemplary for the computer system within which a set of instructions for causing machine to perform any one of the methodologies of the invention may be executed.

FIG. 9 shows a diagrammatic representation of a machine in the exemplary form of a computer system 300 within which a set of instructions, for causing the machine to perform any one of the methodologies discussed above may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g., a keyboard), a cursor control device 314 (e.g., a mouse), a disk drive unit 316, a signal generation device 320 (e.g., a speaker) and a network interface device 322

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system automatically to remind parties to a network-based transaction to comply with obligations established under a transaction agreement have been described. Although the present invention has been described with reference to specific exemplary embodiments, various modifications and changes may be made to these embodiments without departing from the broader spirit and scope of the invention. Accordingly, the specification and drawings are to be regarded in an illustrative rather than a restrictive sense.

What is claimed is:

1. A method to facilitate a network-based commerce transaction, the method including:
   recording establishment of a commerce transaction agreement between the first and second parties for purchase of an offering, wherein the commerce transaction agreement is established utilizing a network-based transaction system and wherein the commerce transaction agreement imposes first and second obligations on the first and second parties, respectively; and
   automatically presenting a reminder option to the first party that is exercisable by the first party to remind the second party to comply with the obligations of the second party imposed under the commerce transaction agreement.

2. The method of claim 1 including only automatically presenting the reminder option a predetermined time interval after the establishment of the commerce transaction agreement between the first and second parties.

3. The method of claim 2 wherein the predetermined time interval is at least three days.

4. The method of claim 1 including automatically disabling the reminder option after the issuance of a predetermined number of reminders to the second party by exercising of the reminder option by the first party.

5. The method of claim 1 wherein the reminding of the second party comprises issuing an electronic communication to the second party.

6. The method of claim 5 wherein the electronic communication includes any one of a group of communications including an electronic mail message, a page message, a wireless access protocol (WAP) message, a simple message service (SMS) message and a display on a markup language document.

7. The method of claim 1 wherein the first party comprises a seller of the offering and the second party comprises a buyer of the offering, and wherein the reminder option comprises an option to communicate a payment reminder to the buyer of the offering to provide a payment to the seller of the offering.

8. The method of claim 1 wherein the first party comprises a buyer of the offering and the second party comprises a seller of the offering, and wherein the reminder option comprises an option to communicate a delivery reminder to the seller of the offering to deliver the offering to the buyer.

9. The method of claim 1 wherein the commerce transaction agreement is concluded between the first and second parties utilizing a network-based auction facility, and wherein the recording of the establishment of the commerce transaction agreement is performed at the network-based auction facility.

10. The method of claim 1 wherein the commerce transaction agreement is concluded between first and second parties utilizing a peer-to-peer trading system, and wherein the recording of the establishment of the commerce transaction agreement is performed at a computer systems of the first party.

11. The method of claim 1 wherein the automatic presentation of the reminder option comprises presenting a reminder display element utilizing a graphical user interface, the reminder display element being user-selectable to initiate a reminder process.

12. The method of claim 11 wherein the reminder display element comprises any one of a group of elements including a graphic element and a text element.

13. The method of claim 11 wherein the graphical user interface comprises a markup language document.

14. The method of claim 11 wherein the reminder display element is displayed in association with description information regarding the commerce transaction.

15. The method of claim 11 wherein the reminder display element is displayed in a first state prior to the expiration of a predetermined time interval after the establishment of the commerce transaction agreement to indicate that the reminder option is unavailable until after expiration of the predetermined time interval.

16. The method of claim 15 wherein the reminder display element is displayed in a second state subsequent to exercising of the reminder option a predetermined number of times by the first party.

17. The method of claim 16 wherein the reminder display element is displayed in a third state to indicate that the reminder option is available to the first party after the expiration of the predetermined time interval and prior to the exercising of the reminder option a predetermined number of times by the first party.

18. A system to facilitate a network-based commerce transaction, the system including:
   a database to record establishment of a commerce transaction agreement between the first and second parties for purchase of an offering, wherein the commerce transaction agreement is established utilizing a network-based transaction system and wherein the commerce transaction agreement imposes first and second obligations on the first and second parties, respectively; and
   a communication engine automatically to present a reminder option to the first party that is exercisable by the first party to remind the second party to comply with the obligations of the second party imposed under the commerce transaction agreement.

19. The system of claim 18 wherein the communication engine is only automatically to present the reminder option a predetermined time interval after the establishment of the commerce transaction agreement between the first and second parties.

20. The system of claim 19 wherein the predetermined time interval is at least three days.

21. The system of claim 18 wherein the communication engine is automatically to disable the reminder option after the issuance of a predetermined number of reminders to the second party by exercising of the reminder option by the first party.

22. The system of claim 18 wherein the communication engine is automatically to issue an electronic communication to the second party to remind the second party to comply with the obligations of the second party.

23. The system of claim 22 wherein the electronic communication includes any one of a group of communications including an electronic mail message, a page message, a wireless access protocol (WAP) message, a simple message service (SMS) message and a display on a markup language document.

24. The system of claim 18 wherein the first party comprises a seller of the offering and the second party comprises a buyer of the offering, and wherein the reminder option comprises an option to communicate a payment reminder to the buyer of the offering to provide a payment to the seller of the offering.

25. The system of claim 18 wherein the first party comprises a buyer of the offering and the second party comprises a seller of the offering, and wherein the reminder option comprises an option to communicate a delivery reminder to the seller of the offering to deliver the offering to the buyer.

26. The system of claim 18 wherein the commerce transaction agreement is concluded between the first and second parties utilizing a network-based auction facility, and wherein the database to record the establishment of the commerce transaction agreement is located at the network-based auction facility.

27. The system of claim 18 wherein the commerce transaction agreement is concluded between first and second parties utilizing a peer-to-peer trading system, and wherein the database to record the establishment of the commerce transaction agreement is located at a computer systems of the first party.

28. The system of claim 18 wherein the communication engine is to present a reminder display element utilizing a graphical user interface, the reminder display element being user-selectable to initiate a reminder process.

29. The system of claim 28 wherein the reminder display element comprises any one of a group of elements including a graphic element and a text element.

30. The system of claim 28 wherein the communication engine includes a page server, and wherein graphical user interface comprises a markup language document.

31. The system of claim 28 wherein the communication engine is to display the reminder display element in association with description information regarding the commerce transaction.

32. The system of claim 28 wherein the communication engine is to display the reminder display element in a first state prior to the expiration of a predetermined time interval after the establishment of the commerce transaction agreement to indicate that the reminder option is unavailable until after expiration of the predetermined time interval.

33. The system of claim 32 wherein the truncation engine is to display the reminder display element in a second state subsequent to exercising of the reminder option a predetermined number of times by the first party.

34. The system of claim 33 wherein the communication engine is to display the reminder display element in a third state to indicate that the reminder option is available to the first party after the expiration of the predetermined time interval and prior to the exercising of the reminder option a predetermined number of times by the first party.

35. A computer-readable medium storing a sequence of instructions that, when executed by a machine, cause of the machine to:
record establishment of a commerce transaction agreement between the first and second parties for purchase of an offering, wherein the commerce transaction agreement is established utilizing a network-based transaction system and wherein the commerce transaction agreement imposes first and second obligations on the first and second parties, respectively; and
automatically present a reminder option to the first party that is exercisable by the first party to remind the second party to comply with the obligations of the second party imposed under the commerce transaction agreement.

* * * * *